United States Patent
Archambeau et al.

(10) Patent No.: US 9,001,282 B2
(45) Date of Patent: Apr. 7, 2015

(54) VARIABLE POWER OPTICAL ELEMENT

(75) Inventors: Samuel Archambeau, Charenton-le-Pont (FR); Henri Camon, Toulouse (FR); Solon Mias, Ixelles (FR)

(73) Assignees: Essilor International (Compagnie Generale d'Optique), Charenton-le-Pont (FR); Centre National de la Recherche Scientifique—CNRS, Paris (FR)

( * ) Notice: Subject to any disclaimer, the term of this patent is extended or adjusted under 35 U.S.C. 154(b) by 953 days.

(21) Appl. No.: 13/139,713

(22) PCT Filed: Dec. 14, 2009

(86) PCT No.: PCT/FR2009/052521
§ 371 (c)(1),
(2), (4) Date: May 15, 2012

(87) PCT Pub. No.: WO2010/076471
PCT Pub. Date: Jul. 8, 2010

(65) Prior Publication Data
US 2012/0218483 A1      Aug. 30, 2012

(30) Foreign Application Priority Data
Dec. 15, 2008   (FR) ..................... 08 58574

(51) Int. Cl.
| G02F 1/1335 | (2006.01) |
| G02F 1/13 | (2006.01) |
| G02C 7/00 | (2006.01) |
| G02F 1/1333 | (2006.01) |
| G02B 3/14 | (2006.01) |
| G02B 26/00 | (2006.01) |
| G02C 7/06 | (2006.01) |
| G02C 7/08 | (2006.01) |

(52) U.S. Cl.
CPC ............ *G02F 1/133377* (2013.01); *G02B 3/14* (2013.01); *G02B 26/005* (2013.01); *G02C 7/06* (2013.01); *G02C 7/061* (2013.01); *G02C 7/08* (2013.01); *G02C 2202/18* (2013.01)

(58) Field of Classification Search
USPC ........... 349/193, 200, 13; 351/159.01, 159.39
See application file for complete search history.

(56) References Cited

U.S. PATENT DOCUMENTS

| 4,572,616 | A | 2/1986 | Kowel et al. |
| 4,601,545 | A * | 7/1986 | Kern .............................. 349/200 |
| 5,576,870 | A * | 11/1996 | Ohmae ......................... 349/201 |
| 6,702,483 | B2 * | 3/2004 | Tsuboi et al. .................. 359/245 |
| 6,778,246 | B2 | 8/2004 | Sun et al. |
| 6,859,333 | B1 | 2/2005 | Ren et al. |
| 2002/0140899 | A1 | 10/2002 | Blum et al. |
| 2003/0039770 | A1 | 2/2003 | Sato et al. |
| 2005/0185135 | A1 | 8/2005 | Blum et al. |
| 2006/0006336 | A1 | 1/2006 | Cano et al. |
| 2007/0041101 | A1 * | 2/2007 | Goosey et al. ................ 359/676 |
| 2011/0013136 | A1 | 1/2011 | Archambeau et al. |

\* cited by examiner

*Primary Examiner* — Dung Nguyen
(74) *Attorney, Agent, or Firm* — Seed IP Law Group PLLC

(57) ABSTRACT

A variable power optical element is divided into cells which contain two liquid crystals mixed according to different proportions. The proportion of one of the liquid crystals in each cell increases on the basis of the radial distance between a central point of the optical element and said cell. An appropriate selection of the two liquid crystals results in a higher variation of the optical power between two control states of said optical element. More particularly, the optical element may consist of an ophthalmic lens which changes between a convergent lens state and a divergent lens state.

10 Claims, 2 Drawing Sheets

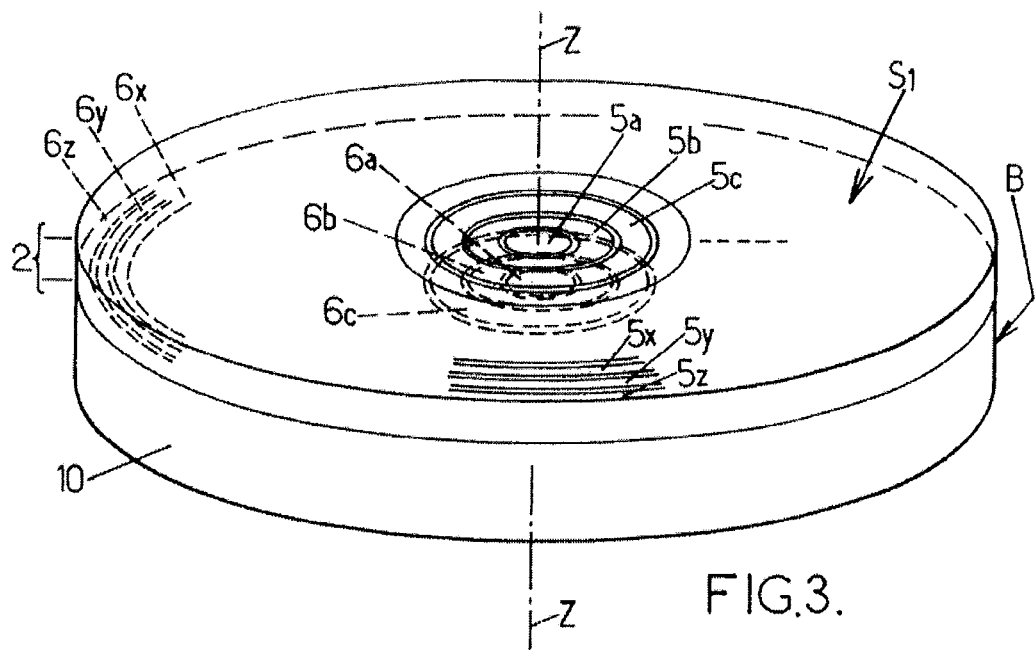
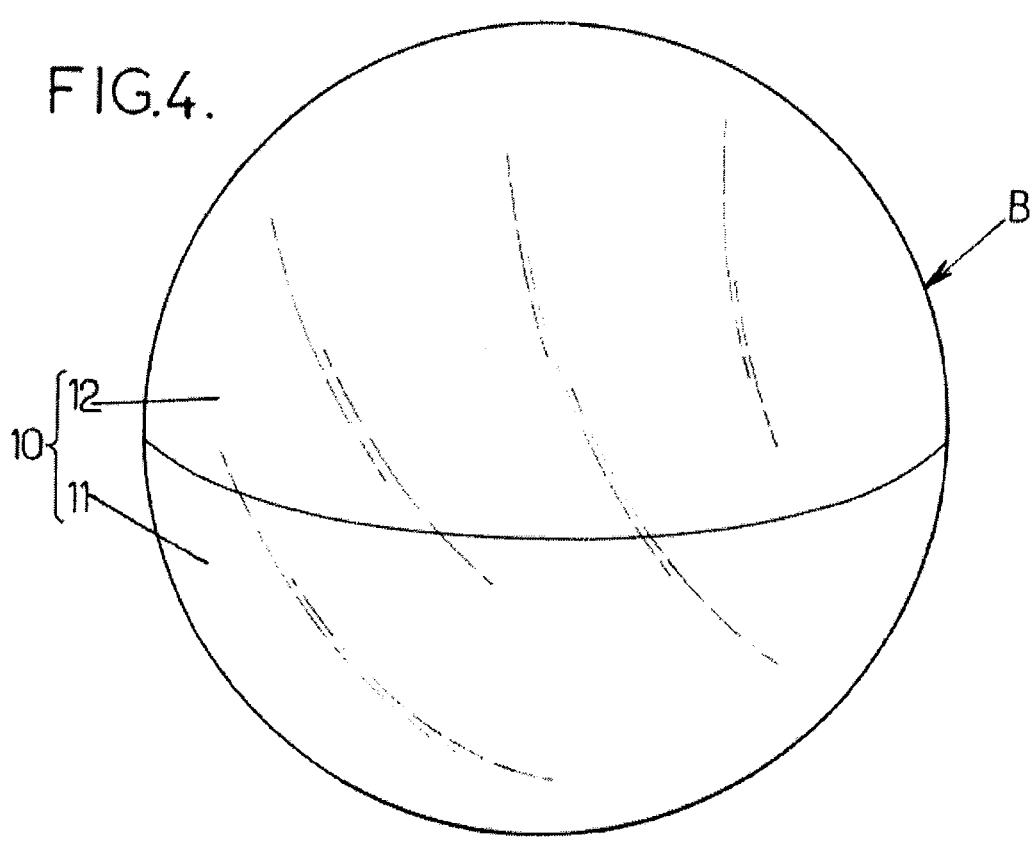

VARIABLE POWER OPTICAL ELEMENT

The present invention relates to a variable power optical element.

It relates in particular to an optical or ophthalmic lens having a variable power.

Lenses of objectives of projection devices already exist, each having a variable optical power. For example, the optical power of the lens can be varied electrically, by application of a suitable electrical voltage between two electrodes borne by this lens. In this way, an image formed on a screen by the projection device can be focussed without the mechanical parts being moved. The focussing can then be carried out with a very short response time, and the manufacturing cost of the objective is reduced.

In a known manner, such a variable power optical element comprises:
- a substrate, which can itself be a lens;
- a reservoir extending parallel to a face of the substrate, containing a nematic or cholesteric liquid crystal; and
- a controllable polarization system capable of causing changes between a homeotropic orientation and a planar orientation of the liquid crystal contained in the reservoir.

For example, the polarization system comprises a transparent, continuous reference electrode, arranged parallel to the face of the substrate on a first side of the reservoir. It also comprises a set of polarization electrodes that are transparent and isolated from each other, and arranged on a second side of the reservoir, also parallel to the face of the substrate. The polarization electrodes are moreover circular and concentric, and electrical voltages can be applied simultaneously and respectively to the polarization electrodes with respect to the reference electrode.

When no electrical voltage is applied, the liquid crystal adopts a spontaneous orientation that is uniform over the whole face of the substrate. This spontaneous orientation is generally determined by a thin brushed polyimide layer in contact with the liquid crystal. It may be planar, for example. When an electrical voltage is applied between the reference electrode and one of the polarization electrodes, the liquid crystal situated at this polarization electrode is deviated by an angle that increases with the value of the electrical voltage. Thus, by simultaneously applying to the polarization electrodes, electrical voltages that increase as a function of the radius thereof, the liquid crystal adopts new orientations that vary progressively between the centre and a perimeter zone of the reservoir. For example, the electrical voltage applied to the central polarization electrode may be zero, so that the planar orientation of the liquid crystal is retained at the centre of the reservoir. Another electrical voltage is applied at the same time to the outermost polarization electrode, which puts the liquid crystal in the homeotropic orientation at this location of the reservoir. The electrical voltages of the intermediate electrodes produce progressive variation of the orientation of the liquid crystal between the centre and the perimeter edge.

The liquid crystal then has locally an apparent value of the refractive index varying between the value for the planar orientation and that for the homeotropic orientation, for a light beam passing through the optical element perpendicularly to the face of the substrate that bears the reservoir.

In a known manner, a nematic or cholesteric liquid crystal has an ordinary index value, denoted $n_o$, and an extraordinary index value, denoted $n_e$. The apparent value of the refractive index is $n_o$ in the perimeter zone of the reservoir where the liquid crystal has the homeotropic orientation, and is equal to $(n_e+n_o)/2$ at the centre of the reservoir where the liquid crystal has the planar orientation. The apparent difference of the refractive index between the centre and the perimeter zone of the reservoir is therefore $(n_e-n_o)/2=\Delta n/2$ in the polarized state, and is zero in the absence of polarization voltage.

If the outermost electrode is circular with a radius R, then the optical effect of the liquid crystal is equivalent to that of an additional lens of optical power P given by the following relationship:

$$P = e \cdot \Delta n / R^2, \qquad (1)$$

where e is the thickness of the reservoir. According to the sign of $\Delta n$, the equivalent lens is convergent or divergent when the polarization system is activated. When the polarization system is not activated, the reservoir has no optical effect, corresponding to an optical power which is zero.

The variation of optical power of the element between the two states is therefore limited by the index difference value $\Delta n=n_e-n_o$ for the liquid crystal used. This limit can be too low for a determined application, regardless of the liquid crystal used.

In order to increase the variation of the optical power of the lens equivalent to the element which has just been described, it is known to add linear polarizers on each side of the reservoir of liquid crystals, parallel to the direction of planar alignment of the liquid crystals. The apparent value of the refractive index for the planar orientation of the liquid crystals is then $n_e$, the apparent difference of the refractive index between the centre and the perimeter zone of the reservoir is $\Delta n$ in the polarized state, and the variation of the optical power between the two states, non-polarized and polarized is $2 \cdot e \cdot \Delta n / R^2$. The variation of the optical power is therefore doubled, but the polarizers cause a reduction of over half of the light transmission of the optical element for natural light, which is incompatible with many applications.

Moreover, transparent optical elements also exist, incorporating liquid crystals contained in closed cells. Such an optical element comprises a substrate and a transparent set of separate cells juxtaposed parallel to a face of the substrate. The cell structure makes it possible to vary compositions of mixtures that are contained in separate cells, these compositions being permanent for the entire life of the element.

An object of the present invention is to provide novel variable power optical elements, the variation of the optical power of which is greater than those of already known elements.

For this purpose, the invention proposes a variable power optical element comprising:
- a substrate;
- a transparent set of separate closed cells, juxtaposed parallel to a face of the substrate; and
- a controllable polarization system, capable of causing changes between a homeotropic orientation and a planar orientation of nematic or cholesteric liquid crystals contained in the cells.

Within the framework of the present description, by transparency is meant the ability to clearly view any object or scene through the cell assembly. In other words, the light passing through the cell set is not modified in a manner which could blur the vision. In particular, it is neither diffused nor diffracted, such that a point light source situated at a distance from the optical element is perceived, through the cell assembly, as a point.

An optical element according to the invention is characterized in that at least one cell situated close to a central point of the face of the substrate contains a first nematic or cholesteric liquid crystal, and cells situated at a distance from this central point contain a mixture of this first liquid crystal with a second nematic or cholesteric liquid crystal different from the first liquid crystal. Moreover, a proportion of the second liquid crystal increases with respect to the first liquid crystal in the mixture inside each cell as a function of the radial distance between this cell and the central point of the face of the substrate. This increase of the proportion in each cell as a function of the radial distance, is moreover adapted so that the optical element has a first or a second optical power value for a light beam passing through the cell set, as a function of a command applied to the polarization system.

Thus, an optical element according to the invention incorporates two liquid crystals, which are mixed in variable proportions inside different cells. These proportions are permanent, thanks to the placing of each mixture in separate closed cells. In this way, the contents of neighbouring cells are not in contact, and cannot diffuse from one cell to another.

Moreover, thanks to the progressive variation of the proportions of the mixtures contained in cells increasingly further from the centre of the face of the substrate, and by suitably commanding the polarization system, it is possible to control simultaneously the respective orientations of the first liquid crystal at the centre of the face of the substrate, and of the second liquid crystal in a perimeter zone of the substrate. Thus, the first liquid crystal can have a first orientation at the centre of the substrate, and the second liquid crystal can at the same time have a second orientation in the perimeter zone, with a continuous variation of the orientation of the mixtures contained in the intermediate cells between the centre and the perimeter zone. An appropriate selection of the first and second liquid crystal, as well as their respective orientations, therefore makes it possible to combine their respective differences Δn between the two extraordinary $n_e$ and ordinary $n_o$ refractive indices of the same liquid crystal, so that the optical power of the element has an increased variation between the two control states, with respect to an optical element containing only the first or only the second liquid crystal.

Optical elements according to the invention can then be used for a greater number of applications. In particular, they may be used in instruments for the projection of images, optical instruments for observation or sighting, or ophthalmic applications.

Moreover, an optical element according to the invention has dimensions and a space requirement which are substantially identical to those of a variable power optical element such as previously known.

The weight of the optical element may also be substantially identical to that of the substrate, which is particularly advantageous for an ophthalmic application in particular.

A greater variation between the optical powers of the element which are produced in two extreme states of polarization can be obtained under the following conditions:

at least one cell situated close to the central point of the face of the substrate contains the first liquid crystal without containing the second liquid crystal; and/or cells situated in the vicinity of a perimeter edge of the substrate contain the second liquid crystal without containing the first liquid crystal.

According to a first embodiment of the invention, the controllable polarization system may comprise two transparent electrodes which are facing each other and each extend parallel to the face of the substrate. The cell set is then situated between the two electrodes, so that the latter produce an electric field in all the cells when an electrical voltage is applied between the electrodes. Moreover, for this first embodiment, the first and second liquid crystals respectively have a first and a second dielectric anisotropy with respective signs that are opposite. The system is arranged moreover so that a variation of the electrical voltage applied between the two electrodes causes a change between an orientation of the planar type and an orientation of the homeotropic type for one of the first and second liquid crystals, and simultaneously causes an reverse change between these types of orientation for the other liquid crystal, in those cells containing the first liquid crystal without a second liquid crystal or the second liquid crystal without the first liquid crystal.

An advantage of this first embodiment of the invention resides in the ability to use the continuous electrodes in order to produce the electric polarization field in the cells. Such electrodes can be simply formed, without an etching stage, so that the production cost of the optical element is reduced.

According to a second embodiment of the invention, the controllable polarization system may comprise two arrays of transparent electrodes which are facing each other, each parallel to the face of the substrate. The cell set is then situated between the two arrays of electrodes, so that the latter produce an electric field in at least some of the cells when an addressing command of these cells is given. This second embodiment may be adapted, in particular, when the first and second liquid crystals have respective thresholds for the electric field which are different, in order to trigger simultaneously changes of orientation of these liquid crystals in cells where they are present in an unmixed form. It is also adapted to the case in which the first and second liquid crystals have respective dielectric anisotropies having identical signs.

Generally, in order to improve control of the state of the optical element when no command signal is addressed to the polarization system, the optical element may comprise moreover within the cells, portions of anchoring surface of the liquid crystals. These portions of anchoring surface are then adapted in order to set an orientation of the first or second liquid crystal in those cells containing this liquid crystal without containing the other liquid crystal, when the controllable polarization system is not activated.

Finally, the substrate of the optical element may itself comprise an optical lens or a portion of optical lens. The cell set containing the liquid crystals then produces a variable additional optical power, which combines with the optical power of the substrate lens.

Other features and advantages of the present invention will become apparent in the following description of non-limitative embodiments, with reference to the attached drawings, in which:

FIGS. 3 and 4 show another two optical elements according to the invention.

In these figures, for reasons of clarity, the dimensions of the elements shown do not correspond either to actual dimensions or dimensional relationships. Moreover, identical references in different figures denote identical elements, or those having identical functions.

Technical elements that are well known to a person skilled in the art will not be described in detail below. In particular, reference may be made to documents that are available elsewhere with regard to the method of production of the cell assembly, as well as the structure and use of liquid crystals.

The invention is now described in the particular case of an ophthalmic application, but it is understood that the latter is non-limitative. On reading this description, a person skilled in the art will know how to adapt the necessary parameters in order to apply the invention to other fields.

Figure 1:
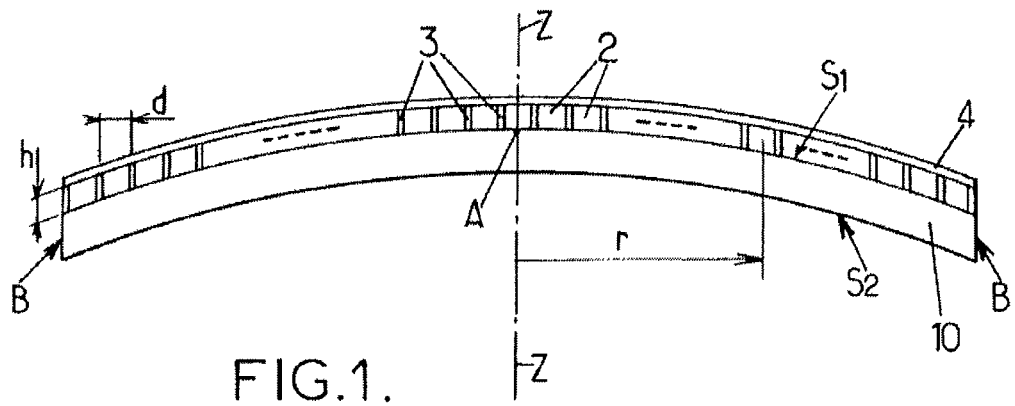
FIG. 1 is a cross section of a first optical element according to the invention.

As shown in FIG. 1, a substrate 10 comprises an ophthalmic lens or a portion of ophthalmic lens when the sought variation of optical power is limited to a restricted portion of a spectacle eyeglass. In a known manner, such an ophthalmic lens may be a semi-finished eyeglass, a single face of which has a final shape. Alternatively, this may be a finished eyeglass, both faces of which already have their final shapes. When a finished eyeglass is concerned, the latter may also have the perimeter edge of the eyeglass semi-finished, for example a circular edge of 60 cm (centimetres) diameter, or already have been machined to the dimensions of a seat of a spectacle frame in which it is intended to be assembled.

The front and rear faces of the lens 10 are denoted respectively $S_1$ and $S_2$. The face $S_1$ is convex and the face $S_2$ is concave. For reasons of clarity in FIGS. 2a and 2b, the face $S_1$ of the lens 10 is shown flat in these two figures, but it is understood that in reality it may be convex as has just been described. The cell structure necessary for implementing the invention may be arranged on one or other of the two faces $S_1$ and $S_2$. Optionally, two or more of such cell structures may be combined in the same spectacle eyeglass, by being superimposed on one of the faces $S_1$ or $S_2$, or distributed over these two faces. B denotes the perimeter edge of the lens 10, which is either the edge of the semi-finished eyeglass, or the edge of the spectacle eyeglass after machining.

For example, a cell set 2 continuously covers the face $S_1$ up to the perimeter edge B. The cell set 2 is defined by a network of walls 3, each wall separating two adjacent cells. The walls 3 extend substantially perpendicularly to the face $S_1$, with a height h that may be comprised between 5 and 100 µm (micrometer). For example, the height h may be equal to 20 µm. The cells 2 are each hermetically closed, for example with a sealing film 4 which is continuous and fixed on the tops of the walls 3 opposite to the lens 10. The dimensions of each cell 2 parallel to the face $S_1$ may be comprised between 10 and 200 µm, for example substantially equal to 50 µm.

Z-Z marks an axis of rotational symmetry for the proportions of the liquid crystals contained in the cell 2. In other words, these proportions vary on the basis of the radial distance r which is measured between the axis Z-Z and each cell 2. The axis Z-Z may coincide with an axis of the lens 10, preferably the optical axis thereof. A denotes a central point of the face $S_1$. For reasons of simplicity, it is assumed hereinafter that the axis Z-Z passes through the point A, unless otherwise stated.

The reference 20 denotes a cell 2 situated at the point A, or close thereto. The reference 21 denotes a cell 2 situated close to the perimeter edge B. The reference 2 is kept to denote generically any cell 2.

Figure 2A:
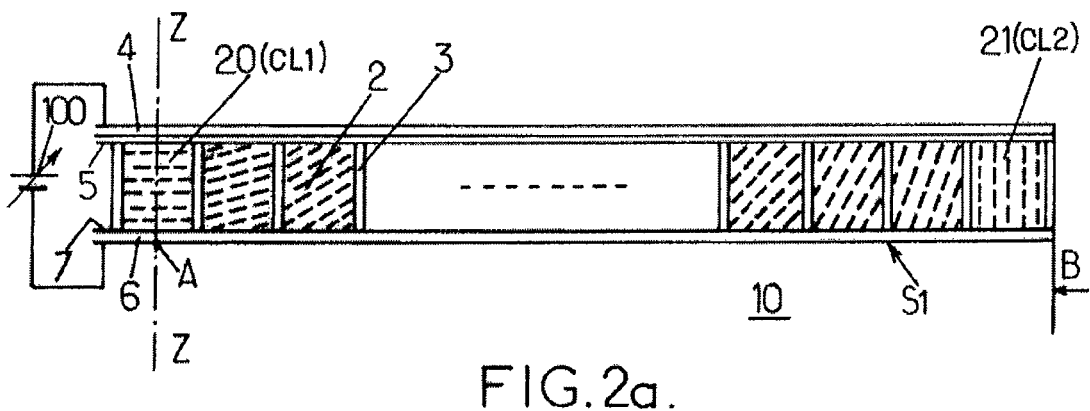
FIGS. 2a and 2b are enlargements of a part of FIG. 1, showing two different states of the optical element.
Figure 2B:
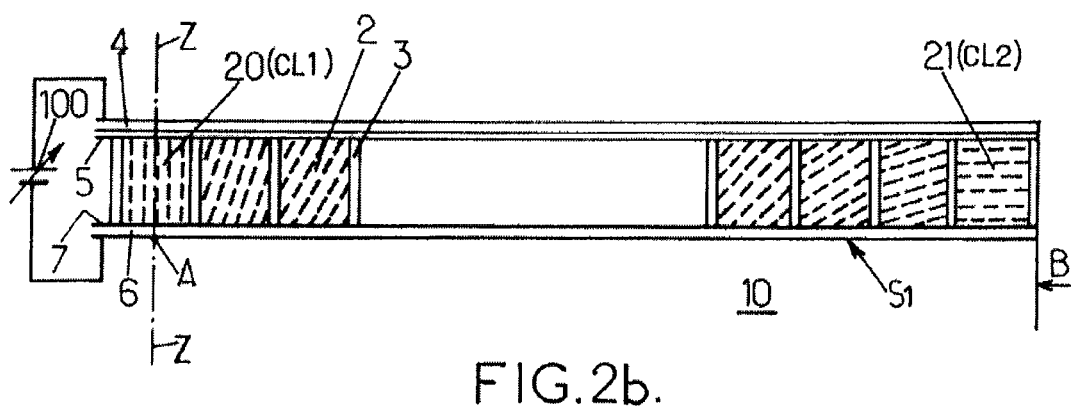

In FIGS. 2a and 2b, the references 5 and 6 denote two electrodes situated respectively above and below the cell set 2, along the axis Z-Z. The electrode 5 may be borne by the film 4, and the electrode 6 may be borne by the face $S_1$ of the lens 10. These electrodes 5 and 6 are constituted by an electrically conductive material, which may be for example tin-doped indium-tin oxide (ITO). These each have a thickness which may be comprised between 0.01 and 0.5 µm, for example. The electrodes 5 and 6 are continuous in a first embodiment of the invention which is now described, and each have the same extent as the face $S_1$. An adjustable electrical supply 100 is electrically connected to the electrodes 5 and 6. When this electrical supply 100 produces a non-zero electrical voltage, the electrodes 5 and 6 create an electric field which is substantially identical in all the cells 2. The supply 100 and the electrodes 5 and 6 together constitute the controllable polarization system which makes it possible to orientate the liquid crystals contained in the cells 2.

Two nematic or cholesteric liquid crystals, hereinafter denoted CL1 and CL2, are distributed in the cells 2, with proportions varying on the basis of the radial distance r. In particular, the proportion of CL2 inside each cell 2 increases with the distance r.

Without constituting a general limitation of the invention, it is assumed that the proportion of CL2 is zero in the cell 20, and is equal to 1.00 in the cell 21. For example, this proportion of CL2 may be substantially equal to $(r/R)^2$, where R is the radius of the circular edge B. Clearly, such a variation of the proportion is only carried out for discrete values of the radial distance r, corresponding to respective reference points of cell 2, for example at centres thereof. Moreover, the variations of the proportion of CL2 between different cells may be multiples of a fixed increment, which depends on the technique used for mixing the liquid crystals CL1 and CL2. The proportion of CL1 in each cell 2 is complementary to that of CL2, when the mixtures contain only two components.

In a known manner, when no polarization system is activated, liquid crystals adopt an orientation fixed by an anchoring surface with which they are in contact. Such an anchoring surface may be constituted by a polymer, which has an oriented surface texture. In the absence of an external polarization field, the anchoring surface can orient nematic or cholesteric liquid crystals either in a planar fashion or a homeotropic fashion. This orientation depends on the liquid crystals themselves, the polymer of the anchoring surface, the type of texturing of this surface, as well as the nature of the interaction between the liquid crystals and the polymer.

It is recalled that the liquid crystals CL1 or CL2 have a planar orientation when they are parallel to the face $S_1$. In this case, this orientation may vary inside a single cell 2, between surfaces parallel to the face $S_1$ and situated at different heights along the axis Z-Z. The homeotropic orientation corresponds to the liquid crystals CL1 or CL2 which are perpendicular to the face $S_1$.

The reference 7 denotes a polymer layer which forms an anchoring surface. It may be continuous and arranged between the electrode 6 and the network of walls 3. Alternatively, the layer 7 may be borne by the electrode 5, or be formed from disjointed portions which coincide with the inner volumes of the cells 2. Optionally, portions of anchoring surface may also be borne by the walls 3. In all cases, they are in direct contact with the liquid crystals contained in the cells 2.

These anchoring surface portions may be adapted so that, when the controllable polarization system is not activated, the first liquid crystal has a planar orientation in those cells containing this first liquid crystal without the second liquid crystal, and so that the second liquid crystal simultaneously has the homeotropic orientation in those cells containing the second liquid crystal without the first liquid crystal. In other words, CL1 has a planar orientation inside the cell 20 and CL2 has the homeotropic orientation in the cells 21, or vice-versa, when the supply 100 delivers zero voltage or is disconnected from at least one of the electrodes 5 or 6. Once the liquid crystals CL1 and CL2 are selected, a person skilled in the art knows how to determine the layer 7 in order to obtain simultaneously two opposite orientations, planar and homeotropic, for CL1 and CL2 respectively in the cells 20 and 21. Optionally, the portions of anchoring surface may be varied between the cells 20 and 21 in order to obtain such a state of the optical element in the absence of electric polarization.

FIG. 2a shows the optical element when the liquid crystals CL1 have a planar orientation inside the cell 20, and the liquid crystals CL2 simultaneously have the homeotropic orientation inside the cells 21. Between the cell 20 and the cells 21, the liquid crystals adopt an intermediate oblique orientation which depends on the proportions of CL1 and CL2 in each cell 2. Given that the proportion of CL2 increases with the radial distance r, the orientation within the cells becomes progressively more vertical when r increases. This state of the optical element can be spontaneous in the absence of electrical voltage delivered by the supply 100.

Moreover, the liquid crystals CL1 and CL2 have dielectric anisotropies which have opposite signs. It is recalled that the dielectric anisotropy DA of a liquid crystal denotes the relative difference between the squares of its refractive index values, respectively ordinary $n_o$ and extraordinary $n_e$, i.e.: $DA=(n_e^2-n_o^2)/n_o^2$. In other words, one of the liquid crystals CL1 and CL2 adopts a planar orientation and the other the homeotropic orientation, for a sufficient value of the electrical voltage applied between the two electrodes 5 and 6.

FIG. 2b shows the optical element in the polarization state opposite to that in FIG. 2a: the orientation of the liquid crystals CL1 is homeotropic inside the cell 20, and the orientation of the liquid crystals CL2 is simultaneously planar inside the cell 21. This state corresponds to a value of the electrical voltage produced by the supply 100 which is greater than the respective selectivity thresholds of CL1 and CL2.

In the state in FIG. 2a, the liquid crystal CL1 has the apparent refractive index value $(n_{e1}+n_{o1})/2$ in cell 20, where $n_{o1}$ and $n_{e1}$ are respectively the ordinary and extraordinary light-refractive indices of CL1. Within the framework of the present description, by apparent value (resp. variation) of the refractive index of light is meant a value (resp. variation) affecting light rays passing through the optical element substantially perpendicularly to the face $S_1$. Simultaneously, the liquid crystal CL2 has the apparent refractive index value $n_{o2}$ in the cells 21, where $n_{o2}$ is the ordinary refractive index of CL2. The apparent difference of the index between the edge B and the central point A for this first state is then:

$$\Delta 1 = n_{o2} - (n_{e1}+n_{o1})/2, \quad (2)$$

corresponding to a first optical power value $P_1 = 2 \cdot e \cdot \Delta_1/R^2$.

Similarly, the apparent variation of the index between the edge B and the point A in the state in FIG. 2b is:

$$\Delta_2 = (n_{e2}+n_{o2})/2 - n_{o1}, \quad (3)$$

where $n_{e2}$ is the extraordinary refractive index of CL2. The corresponding value of the optical power of the element is then: $P_2 = 2 \cdot e \cdot \Delta_2/R^2$.

The variation $\Delta P$ between the values $P_1$ and $P_2$ of the optical power, is therefore:

$$\Delta P = P_2 - P_1$$
$$= (\Delta_2 - \Delta_1) 2 \cdot e / R^2$$
$$= [(n_{e2} - n_{o2})/2 + (n_{e1} - n_{o1})/2] \cdot 2 \cdot e / R^2$$
$$= (\Delta n_1 + \Delta n_2) \cdot e / R^2$$

where $\Delta n_1$ and $\Delta n_2$ are the differences between the extraordinary and ordinary indices, respectively for the liquid crystals CL1 and CL2.

By using a formalism identical to that of relationship (1), $$\Delta P = \Delta P_1 + \Delta P_2 \text{ is obtained.}$$

Thus, the variations of optical power $\Delta P_1$ and $\Delta P_2$ are combined in an additive fashion in the optical element according to the invention which has been described, in comparison with an optical element having only one liquid crystal as previously known. A suitable choice of the two liquid crystals CL1 and CL2 therefore provides a variation $\Delta P$ which can be greater, in absolute value, than each of the variations $\Delta P_1$ and $\Delta P_2$ which would be obtained separately by using the first liquid crystal only or the second liquid crystal only.

When the liquid crystals CL1 and CL2 moreover comply with the following condition:

$$n_{o2} < (n_{o1}+n_{e1})/2 \quad (4)$$

then the apparent difference of the index $\Delta_1$ between the cells 21 on the one hand, and the cell 20 on the other hand, for the state in FIG. 2a, is negative. The optical power value $P_1$ is also negative, corresponding to an optical effect of the element which is of the same type as that of a divergent lens.

If the liquid crystals CL1 and CL2 also comply with the condition:

$$n_{o1} < (n_{o2}+n_{e2})/2 \quad (5)$$

then the apparent difference of the index $\Delta_2$ for the state in FIG. 2b is positive, in a similar way to the optical power value $P_2$. The element then has an optical effect which is of the same type as that of a convergent lens.

Finally, if the liquid crystals CL1 and CL2 also comply with both conditions (4) and (5), then the optical power changes sign between the two control states. In other words, the optical element changes from a convergent lens behaviour to that of a divergent lens, in a controlled and reversible fashion.

FIG. 3 is a perspective view of a variant embodiment of the invention, in which the continuous electrodes 5 and 6 are replaced by two transparent arrays of electrodes. These extend facing each other, parallel to the face $S_1$, and the cell set 2 is situated between these two arrays of electrodes. In this way, the arrays of electrodes produce an electric field in at least some of the cells 2 when a command is given to address these cells. In Figure, the references 5a . . . , 5z and 6a . . . , 6z individually denote the electrodes of each array. For example, the electrodes of each array can be circular and concentric around the axis Z-Z. The use of such arrays of electrodes allows improved electrical control of the oblique orientation of the liquid crystals in the cells 2 which are intermediate between the central cell 20 and the perimeter cells 21. For this purpose, suitable electrical voltages, varying progressively as a function of the radial distance r, can be applied to each pair of opposite electrodes. Optical aberrations can also be reduced in this way, for a light beam passing through the optical element.

Optionally, a single one of the electrodes 5 or 6 may be replaced by an array of electrodes as previously described. In this case, the remaining continuous electrode may constitute an electric potential reference surface.

When the controllable polarization system is of the electric field type, with at least one array of electrodes making it possible to produce different electric field intensities in the cell 20 and the cells 21, it is not essential for the respective anisotropic dielectrics of the two liquid crystals CL1 and CL2 to have opposite signs. In fact, the two states in FIGS. 2a and 2b may be obtained by producing in the cell 20 and the cells 21, for each of these states, electric field intensities that are suitable with respect to the limit values for the change of orientation for each liquid crystal. Similarly, the use of portions of anchoring surface is not necessarily essential for certain liquid crystal pairs CL1 and CL2.

As shown in FIG. 4, the invention may be applied inside only a single portion of the substrate 10, in order to obtain a multifocal lens. FIG. 4 is a plan view of the optical element, which is bounded by the perimeter edge B. In this case, the substrate 10 comprises at least two portions of ophthalmic lenses which are referenced respectively 11 and 12, and the optical element complies with one of the embodiments of the invention previously described for the lens portion 11. The optical element then has a first or a second power value for a first light beam passing through the lens portion 11, as a function of the command applied to the polarization system. It has moreover a third optical power value for a second light beam passing through the lens portion 12. The optical element is then a bifocal ophthalmic eyeglass, one of the constituent portions of which has a variable optical power.

Optionally, the first or the second optical power value of such an ophthalmic eyeglass, produced according to the invention at the lens portion 11, may be equal to the third optical power value produced at the lens portion 12. The ophthalmic eyeglass is then bifocal in one of the control states of the polarization system, while it is single-vision in the other control state.

A further embodiment of the invention relates to producing a progressive ophthalmic lens having variable characteristics. For this purpose, the active portion 11 of the optical element, in which the optical power is variable, may correspond to the near-vision zone of the progressive lens. The polarization system, when activated, may moreover be capable of producing an optical power which decreases continuously between a centre of the portion 11 and a boundary of this portion with the inactive portion 12.

It is understood that the invention can be reproduced by modifying several aspects of the embodiments which have been described in detail above. In particular, the inventors mention the following modifications, which can be introduced simply on the basis of the information contained in the preceding description:

the cell assembly containing mixtures of liquid crystals may be bounded within a restricted portion of the lens 10 acting as substrate. In this case the axis Z-Z does not necessarily correspond to the optical axis of the lens 10, in particular if the portion of the lens 10 in which the invention is implemented is off centre;

the substrate may be a prism or a mirror;

when the electric polarization system contains two arrays of electrodes, each network may have any configuration whatever, in particular in order to define an addressing of regions in the optical element that is adapted to the application envisaged. In particular, one of the arrays of electrodes may define an angular cut-out of the substrate around the point A; and the controllable polarization system may be electric with electrodes, but also magnetic using magnetic polarization coils. For certain liquid crystals called "dual frequency", the orientation command of the liquid crystals which is produced by the polarization system may also be based on variations of a frequency of a polarization field.

The invention claimed is:

1. A variable power optical element, comprising:
a substrate;
a transparent set of cells separated and closed, juxtaposed substantially parallel to a face of the substrate; and
a controllable polarization system configured to cause changes between a homeotropic orientation and a planar orientation of nematic or cholesteric liquid crystals contained in the cells, wherein:
the set includes at least one first cell situated close to a central point of the face of the substrate and containing a nematic or cholesteric first liquid crystal, and second cells situated farther from said central point and containing a mixture of said first liquid crystal with a nematic or cholesteric second liquid crystal different from said first liquid crystal, respective proportions of said second liquid crystal in relation to said first liquid crystal in the mixture inside the second cells increasing as a function of radial distances between said second cells and the central point of the face of the substrate, the proportions of the second liquid crystal in the second cells increase as a function of the radial distance such that said optical element has a first or a second optical power value for a light beam passing through the cell set, as a function of a command applied to the polarization system, the polarization system comprises two transparent electrodes facing each other and each extending substantially parallel to the face of the substrate, and the cell set is situated between the two electrodes so that said electrodes produce an electric field in all of the cells when an electrical voltage is applied between said electrodes, the first and second liquid crystals respectively have first and second dielectric anisotropies with opposite respective signs, and the polarization system is configured to cause, in response to a variation of the electrical voltage applied between the two electrodes, a change between a planar type orientation and a homeotropic type orientation for one of the first and second liquid crystals, and simultaneously a reverse change of orientation between said types for the other of the first and second liquid crystals, in those cells containing the first liquid crystal without the second liquid crystal or the second liquid crystal without the first liquid crystal.

2. An optical element according to claim 1, in which the at least one first cell contains the first liquid crystal without containing the second liquid crystal.

3. An optical element according to claim 1, in which the set includes third cells situated near a perimeter edge of the substrate and containing the second liquid crystal without containing the first liquid crystal.

4. An optical element according to claim 1, in which the first and second liquid crystals comply with the following conditions:

$$n_{o2} < (n_{o1} + n_{e2})/2 \text{ and}$$

$$n_{o1} < (n_{o2} + n_{e2})/2 \text{ where}$$

$n_{o1}$ and $n_{e1}$ are respectively ordinary and extraordinary light-refractive indices for the first liquid crystal, and
$n_{o2}$ and $n_{e2}$ are respectively ordinary and extraordinary light-refractive indices for the second liquid crystal.

5. An optical element according to claim 1, further comprising anchoring surface portions inside the cells and configured to fix an orientation of the first or second liquid crystal in those cells containing said liquid crystal without containing the other liquid crystal when the controllable polarization system is not activated.

6. An optical element according to claim 5, in which said anchoring surface portions are adapted so that when the controllable polarization system is not activated, the orientation of the first liquid crystal is of the homeotropic type or of the planar type in those cells containing the first liquid crystal without containing the second liquid crystal and the orientation of the second liquid crystal is simultaneously the other of said types in those cells containing said second liquid crystal without the first liquid crystal.

7. An optical element according to claim 1, in which the substrate comprises an optical lens or a portion of an optical lens.

8. An optical element according to claim 1, in which the substrate comprises an ophthalmic lens or a portion of an ophthalmic lens.

9. An optical element according to claim 8, in which:
the substrate comprises at least a first ophthalmic lens portion and a second ophthalmic lens portion,
the optical element is positioned on the first ophthalmic lens portion, so that said optical element has a first or a second optical power value for a first light beam passing through
the first ophthalmic lens portion, as a function of the command applied to the polarization system, and the optical element has a third optical power value for a second light beam passing through the second ophthalmic lens portion.

10. An optical element according to claim 9, in which one of said first and second optical power values is equal to said third optical power value.

\* \* \* \* \*